US012473748B1

(12) United States Patent
Leaning

(10) Patent No.: US 12,473,748 B1

(45) Date of Patent: Nov. 18, 2025

(54) SEGMENTED LOCK PIN

(71) Applicant: Jeffrey Scott Leaning, Arlington, VA (US)

(72) Inventor: Jeffrey Scott Leaning, Arlington, VA (US)

( * ) Notice: Subject to any disclaimer, the term of this patent is extended or adjusted under 35 U.S.C. 154(b) by 199 days.

(21) Appl. No.: 18/309,820

(22) Filed: Apr. 30, 2023

Related U.S. Application Data

(60) Provisional application No. 63/337,116, filed on May 1, 2022.

(51) Int. Cl.
*E05B 27/00* (2006.01)
*E05B 15/14* (2006.01)

(52) U.S. Cl.
CPC ...... *E05B 27/0021* (2013.01); *E05B 27/0057* (2013.01); *E05B 2015/146* (2013.01)

(58) Field of Classification Search
CPC .. E05B 27/00; E05B 27/0017; E05B 27/0021; E05B 27/0057; E05B 27/006; E05B 27/0067; E05B 2015/146; Y10T 70/7701; Y10T 70/774; Y10T 70/7785; Y10T 70/7599; Y10T 70/7605; Y10T 70/7627; Y10T 70/765; Y10T 70/7531; Y10T 70/7548
USPC ........................................................... 70/493
See application file for complete search history.

(56) References Cited

U.S. PATENT DOCUMENTS

| | | | | |
|---|---|---|---|---|
| 2,194,469 A * | 3/1940 | Fremon | E05B 27/005 | 70/378 |
| 2,232,017 A * | 2/1941 | Wilder | E05B 27/005 | 70/378 |
| 3,320,781 A * | 5/1967 | Hill | E05B 27/005 | 70/389 |
| 3,667,262 A * | 6/1972 | Hill | E05B 27/00 | 70/375 |
| 3,762,193 A * | 10/1973 | Hucknall | E05B 27/006 | 70/378 |
| 5,233,850 A * | 8/1993 | Schroeder | E05B 27/005 | 70/359 |
| 5,966,971 A * | 10/1999 | Keller | E05B 27/0021 | 70/378 |
| 7,634,931 B2 * | 12/2009 | Segien | E05B 27/005 | 70/378 |
| 8,646,299 B2 * | 2/2014 | Sloth | E05B 27/0014 | 70/378 |
| 10,287,799 B2 * | 5/2019 | Nicoara | E05B 27/0021 | |

(Continued)

FOREIGN PATENT DOCUMENTS

GB 2445232 A * 7/2008 ......... E05B 27/0017

*Primary Examiner* — Suzanne L Barrett

(57) ABSTRACT

A segmented lock pin is presented. The segmented lock pin includes a first right cylinder, a second right cylinder, and a coupling member. The first right cylinder is movably joined to the second right cylinder by the coupling member. The first right cylinder is axially, laterally, and rotationally movable with respect to the second right cylinder. When implemented as a driver pin, the segmented lock pin provides no counterrotation feedback during a picking attempt of a lock in which the segmented driver pin is installed once the first right cylinder of the segmented driver pin is in a hull of the lock, the second right cylinder of the segmented driver pin is in a plug of the lock, and an edge of the second right cylinder engages the hull of the lock.

19 Claims, 9 Drawing Sheets

(56) References Cited

U.S. PATENT DOCUMENTS

| | | | | |
|---|---|---|---|---|
| 2006/0059965 | A1* | 3/2006 | Benstead | E05B 27/005 70/383 |
| 2010/0024499 | A1* | 2/2010 | Xu | E05B 47/0044 70/494 |
| 2016/0362912 | A1* | 12/2016 | Nicoara | E05B 27/005 |

* cited by examiner

SEGMENTED LOCK PIN

RELATED APPLICATION

This application claims priority to U.S. Provisional Application No. 63/337,116, filed May 1, 2022, which is hereby incorporated by reference in its entirety.

FIELD OF THE INVENTION

The invention relates to physical locks, such as by way of non-limiting example, padlocks.

BACKGROUND OF THE INVENTION

FIG. 1 depicts a cross-section of a pin tumbler lock 100. The lock 100 includes a cylindrical plug 102 rotationally disposed within a hull 104 and a plurality of pin stacks. Typically, locks have three to fifteen, or more, pin stacks. FIG. 1 depicts an example such pin stack, which includes a key pin 106, a driver pin 108, and a spring 110. The spring 110 forces the driver pin 102 to span the shear line 112 between the plug 102 and the hull 104 when no key is inserted into the keyway of the lock 100, blocking rotation of the plug 102 within the hull 104. When the correct key is inserted into the keyway of the lock 100, it pushes the pin stack upwards, positioning the top of the key pin 106 and the bottom of the driver pin 108 to align with the shear line 112 between the plug 102 and the hull 104. (As used herein, the terms “top,” “bottom,” and the like are descriptive relative to the drawings and non-limiting. The locks and their components described herein may be oriented in any direction.) When all pin stacks are so positioned by the correct key, the plug 102 can axially rotate within the hull 104, activating an unlocking mechanism of the lock 100.

FIG. 2 depicts a cross-section of a lock 200 subjected to a typical picking attack. During such a picking attack, an attacker applies rotational force to the plug 202. Due to manufacturing imperfections and real-world tolerances, pin stacks are not precisely aligned. Therefore, the driver pin in one pin stack, e.g., driver pin 208, will be the first to bind between the plug 202 and hull 204 due to the rotational force. An attacker can use a pick or other implement to feel which driver pin is binding, and use a pick or other implement to apply linear force to the key pin 206, which pushes the driver pin into the hull 204. When the bottom of the driver pin 208 clears the plug 202, the pin is “set,” and the plug slightly rotates in the direction of the rotational force until the next driver pin in one of the pin stacks binds between the plug 202 and hull 204. The attacker can repeat the process of detecting the binding pin and setting it, until all pins are set, the plug 202 is able to rotate, and the lock 200 is unlocked.

FIG. 3 depicts a cross-section of a lock 300 that includes a spool pin 320 as a driver pin. When an attacker applies rotational force to the plug 302 and uses a pick or other implement to force the spool pin 320 to the shear line, the plug 302 rotates relative to the hull 304 and traps the spool pin 302 across the shear line. The bottom lip of the spool pin 320 gets caught on the hull, and, in theory, prevents the spool pin 320 from fully entering the hull 304. However, in practice, skilled attackers can detect the presence of spool pins, such as spool pin 320, and defeat them. For example, when an attacker applies rotational force to the plug 302 and also applies further linear force to the spool pin 320 through the key pin 306 using a pick, the spool pin 320 is levered against the hull 304. This leverage causes the spool pin 320 to straighten relative to the plug 302 and hull 304, which a skilled attacker can feel as counterrotation “feedback” on the plug 302, revealing the presence of the spool pin 320. A skilled attacker can then reduce the applied rotational force accordingly, allowing the leverage of the spool pin 320 to counterrotate the plug 302 relative to the hull 304 sufficiently for the spool pin 320 to clear the plug 302, thus setting the pin. Occasionally, when allowing the plug 302 to counterrotate as described, the bore holes that define the pin stacks will align sufficiently to permit one or more previously set pins to drop, that is, to unset and return to their resting state. However, a skilled attacker can continue the process of setting and resetting pins, in various orders to account for the order in which the pins bind, until all pins are set and the plug is able to rotate, opening the lock.

SUMMARY

According to various embodiments, a lock is presented. The lock includes a hull; a cylindrical plug disposed within the hull, where the plug defines a keyway and a plurality of plug bores that communicate with the keyway through the plug, where the plurality of plug bores, in a locked position of the lock, communicate with a corresponding plurality of hull bores formed in the hull; a plurality of spring-loaded pin stacks comprising a plurality of key pins and a plurality of driver pins, each pin stack including a key pin and a driver pin, where the plurality of spring-loaded pin stacks are movable, by a key inserted into the keyway, to position interfaces between key pins and driver pins to a shear line between the plug and the hull to allow rotation of the plug about its longitudinal axis relative to the hull to unlock the lock; and a segmented driver pin of the plurality of driver pins, where the segmented driver pin includes a first right cylinder and a second right cylinder, where the first right cylinder is movably joined to the second right cylinder, where the first right cylinder is axially, laterally, and rotationally movable with respect to the second right cylinder, and where the segmented driver pin provides no counterrotation feedback during a lock picking attempt once the first right cylinder is in the hull, the second right cylinder is in the plug, and an edge of the second right cylinder engages the hull.

Various optional features of the above embodiments include the following. An axial extent of the first right cylinder may be different from an axial extent of the second right cylinder. The segmented driver pin may have an axial extent that is not an integer multiple of an axial extent of the first right cylinder or of an axial extent of the second right cylinder. The segmented driver pin may include a coupling member that is movably joined to the first right cylinder and movably joined to the second right cylinder. The segmented driver pin may include a third right cylinder, where the third right cylinder is movably joined to the second right cylinder, where the third right cylinder is axially, laterally, and rotationally movable with respect to the second right cylinder. The first right cylinder may define an axial passage through the first right cylinder, the axial passage defining a first aperture at a first end of the first right cylinder and a second aperture at a second end of the first right cylinder, where the first aperture defines a minimum diameter that is smaller than a minimum diameter of the second aperture. The lock may further include a segmented key pin of the plurality of key pins, where the segmented key pin includes a first key pin right cylinder and a second key pin right cylinder, where the first key pin right cylinder is movably joined to the second key pin right cylinder, where the first key pin right cylinder is axially, laterally, and rotationally movable with respect to the second key pin right cylinder. An axial extent of the first key pin right cylinder may be different from an axial extent of the second key pin right cylinder. The segmented key pin may have an axial extent that is not an integer multiple of an axial extent of the first key pin right cylinder or of an axial extent of the second key pin right cylinder. The segmented key pin may include a third key pin right cylinder, where the second key pin right cylinder is movably joined to the third key pin right cylinder, where the second key pin right cylinder is axially, laterally, and rotationally movable with respect to the third key pin right cylinder.

According to various embodiments, a lock repinning kit is presented. The lock repinning kit includes a plurality of pins for repinning a lock, the lock repinning kit including: a plurality of segmented pins, each segmented pin including a first right cylinder and a second right cylinder, where each first right cylinder is movably joined to a respective second right cylinder, where each first right cylinder is axially, laterally, and rotationally movable with respect to the respective second right cylinder.

Various optional features of the above embodiments include the following. The plurality of segmented pins may include a segmented driver pin, where the segmented driver pin provides no counterrotation feedback during a lock picking attempt once the first right cylinder of the segmented driver pin is in a hull of the lock, the second right cylinder of the segmented driver pin is in a plug of the lock, and an edge of the second right cylinder engages the hull. The plurality of segmented pins may include a plurality of segmented key pins. The plurality of segmented key pins may include a first segmented pin and a second segmented pin, where an axial extent of the first segmented pin is greater than an axial extent of the second segmented pin by 0.015 inches or 0.023 inches. The plurality of segmented key pins may include segmented key pins of a plurality of minimum lengths for retrofitting to a lock with a corresponding key that defines at least four different cut depths.

According to various embodiments, a segmented lock driver pin is presented. The segmented lock driver pin includes: a first right cylinder; a second right cylinder; and a coupling member, where the first right cylinder is movably joined to the second right cylinder by the coupling member, where the first right cylinder is axially, laterally, and rotationally movable with respect to the second right cylinder, and where the segmented lock driver pin provides no counterrotation feedback during a picking attempt of a lock in which the segmented driver pin is installed once the first right cylinder of the segmented driver pin is in a hull of the lock, the second right cylinder of the segmented driver pin is in a plug of the lock, and an edge of the second right cylinder engages the hull of the lock.

Various optional features of the above embodiments include the following. The first right cylinder may define an axial passage through the first right cylinder, the axial passage defining a first aperture at a first end of the first right cylinder and a second aperture at a second end of the first right cylinder, where the first aperture defines a minimum diameter that is larger than a minimum diameter of the second aperture. An axial extent of the first right cylinder may be different from an axial extent of the second right cylinder. The segmented lock security pin may have an axial extent that is not an integer multiple of an axial extent of the first right cylinder or of an axial extent of the second right cylinder. The coupling member may be integral with one of the first right cylinder or the second right cylinder.

BRIEF DESCRIPTION OF THE DRAWINGS

Various features of the embodiments can be more fully appreciated, as the same become better understood with reference to the following detailed description of the embodiments when considered in connection with the accompanying figures, in which.

DESCRIPTION OF THE EMBODIMENTS

The invention will now be presented in reference to example embodiments, which are described herein and shown in the accompanying drawings. The example embodiments are described in sufficient detail to enable those skilled in the art to practice the invention, and it is to be understood that other embodiments, including changes to the explicitly described and shown embodiments, may fall within the scope of the invention.

Figure 4:
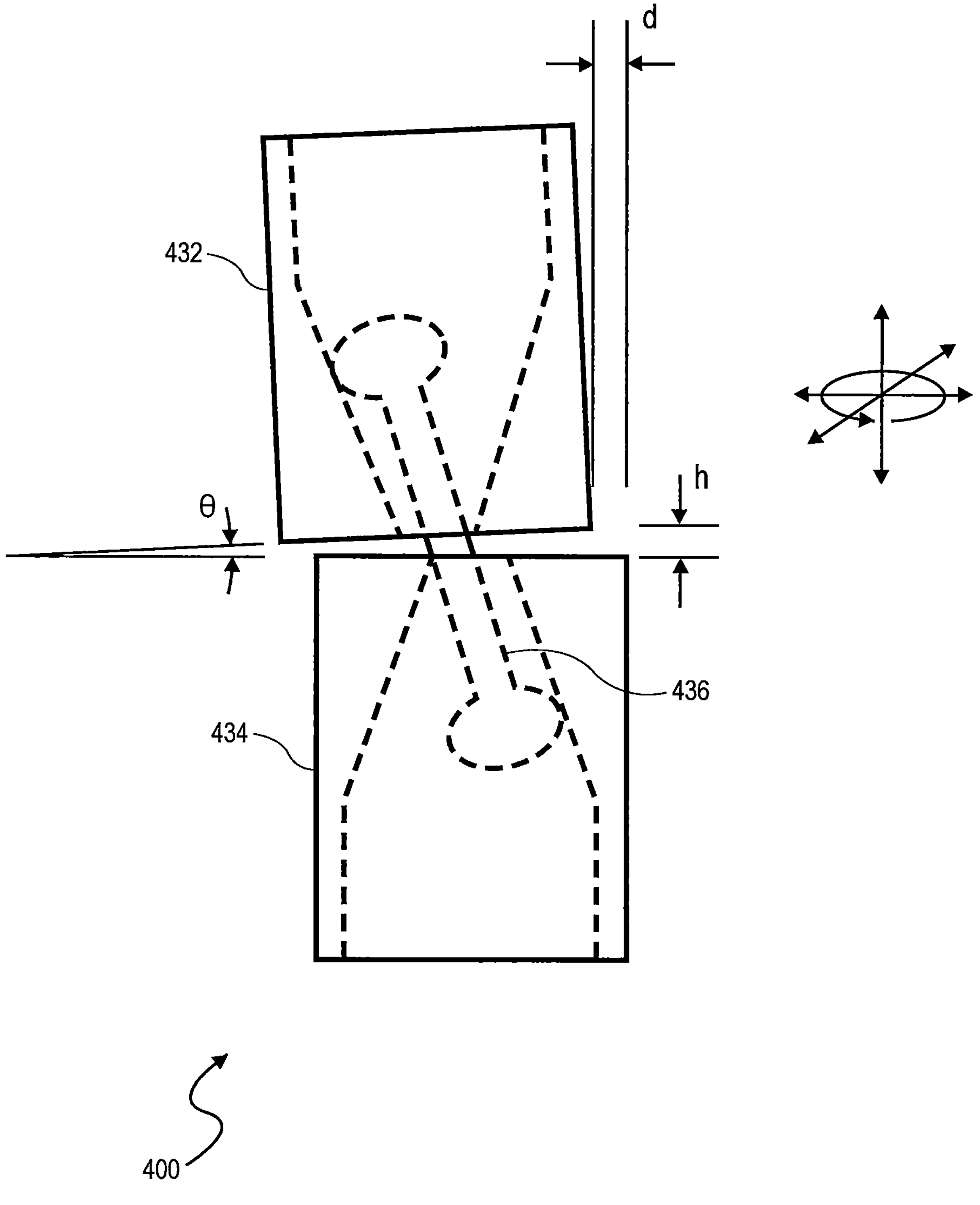
FIG. 4 depicts a cross-section of a segmented driver pin according to various embodiments.

FIG. 4 depicts a cross-section of a segmented driver pin 400 according to various embodiments. Segmented driver pin 400 includes a first right cylinder 432 and a second right cylinder 434. According to some embodiments, and as shown in FIG. 4, the first right cylinder 432 may be constructed identically to the second right cylinder 434. Each right cylinder 432, 434 has an axial passage through from one end to the other end. The axial passage may be asymmetric, with a first aperture at a first end of the right cylinder and a second aperture at the second end of the right cylinder, and with a minimum diameter of the first aperture that is larger than a minimum diameter of the second aperture. (Herein, "minimum diameter" refers to a minimum span across an aperture, through the center of the aperture, and is used for embodiments where an aperture is not circular in profile. For a embodiments in which an aperture has a circular profile, the minimum diameter of the aperture is the same as the diameter of the aperture.) According to some embodiments, the right cylinders 432, 434 have sharp right angle outside edges, e.g., without bevel or chamfer, at the ends that define the smaller aperture, at the ends that define the larger aperture, or at both ends.

The first right cylinder 432 is movably joined to the second right cylinder 434 by a coupling member 436. The coupling member, as shown in FIG. 4, may have end stops that have a wider diameter than the shaft of the coupling member. The end stops may be sized relative to the first right cylinder 432 and the second right cylinder 434 so that the end stops can pass through the wider aperture but not through the narrower aperture. Accordingly, the first right cylinder 432 may be attached to the second right cylinder 434 by way of the coupling member 436, while not being rigidly attached.

The coupling member 436 permits the first right cylinder 432 to move relative to the second right cylinder 434. For example, the first right cylinder 432 may move axially relative to the second right cylinder, that is, the first right cylinder 432 and the second right cylinder 434 may move away from each other and toward each other parallel to an axis through the cylinders. As shown in FIG. 4, a linear measure of such movement is denoted herein as h.

As another example, the relative axial movement of the right cylinders 432, 434 permits the right cylinders 432, 434 to tilt relative to each other. As shown in FIG. 4, an angular measure of such tilt is denoted herein as θ.

As yet another example, the first right cylinder 432 may move laterally relative to the second right cylinder 434, that is, the right cylinders may move relative to each other perpendicular to an axis through the cylinders. As shown in FIG. 4, a linear measure of such movement, as measured parallel to the top of the second right cylinder 434, from the of the edge of the first right cylinder 432 to the to the edge of the second right cylinder 434, is denoted herein as d.

As yet another example, the first right cylinder 432 may move rotationally relative to the second right cylinder 434, that is, the first right cylinder 432 may rotate, relative to the second right cylinder 434, about an axis through the right cylinders 432, 434.

Note that according to some embodiments, the axial, lateral, and rotational movements are independent of each-other. For example, the first right cylinder 432 may move laterally with respect to the second right cylinder 434 without axial, tilt, or rotational movement.

As shown in FIG. 4, in some embodiments, the neither of the first right cylinder 432 nor the second right cylinder 434 is rigidly attached to, or integrated with, the coupling member 436. According to other embodiments, shown and described further below in reference to FIG. 8, the coupling member 436 is rigidly attached to exactly one of the first right cylinder 432 or the second right cylinder 434, while still permitting axial, lateral, and rotational movement of the first right cylinder 432 relative to the second right cylinder 434. For example, the coupling member 436 may be integral to exactly one of the first right cylinder 432 or the second right cylinder 434. In such embodiments, the axial passage may be omitted from the right cylinder to which the coupling member is rigidly attached, and the end stop of the coupling member may be omitted from that side.

Figure 1:
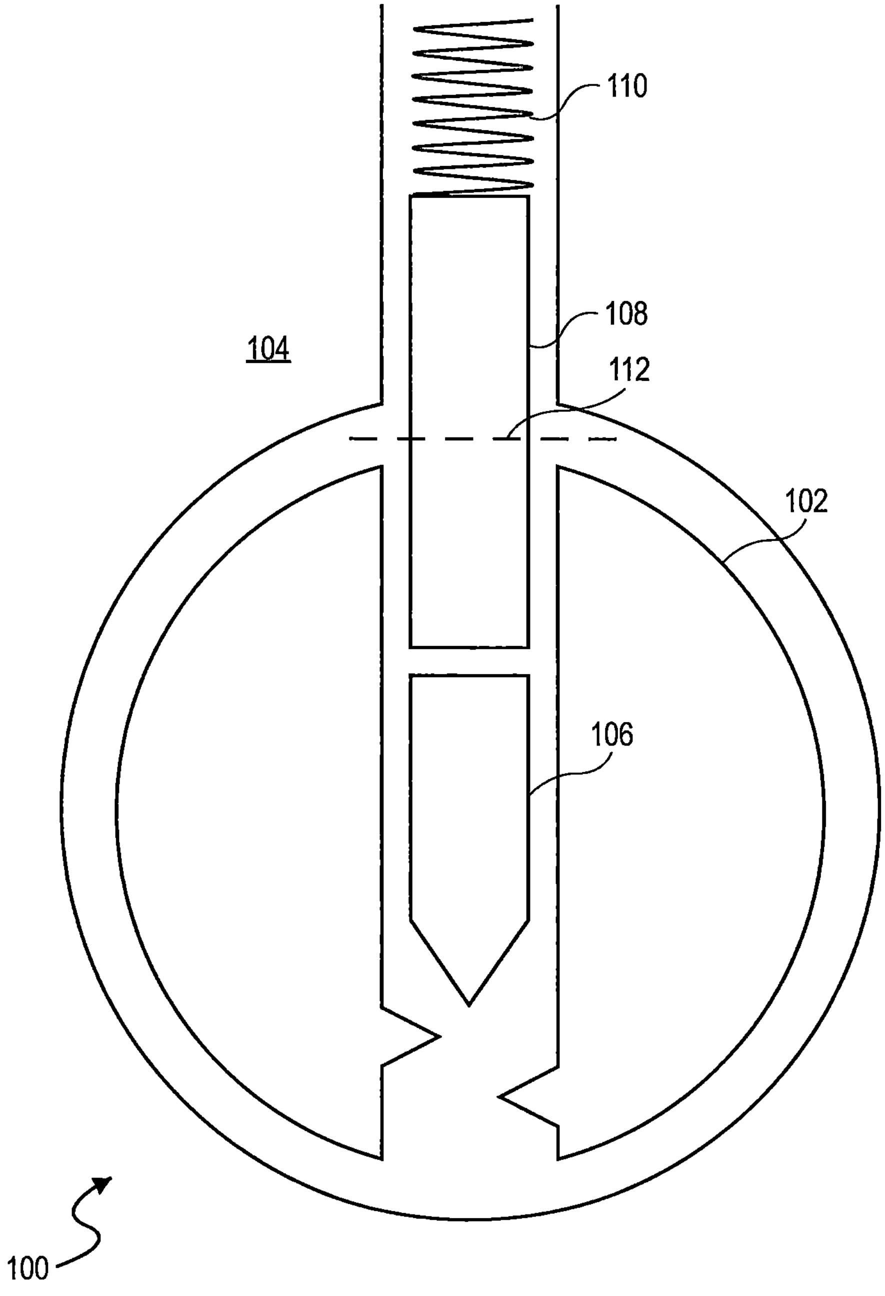
FIG. 1 (PRIOR ART)
FIG. 1 depicts a cross-section of a pin tumbler lock.
Figure 2:
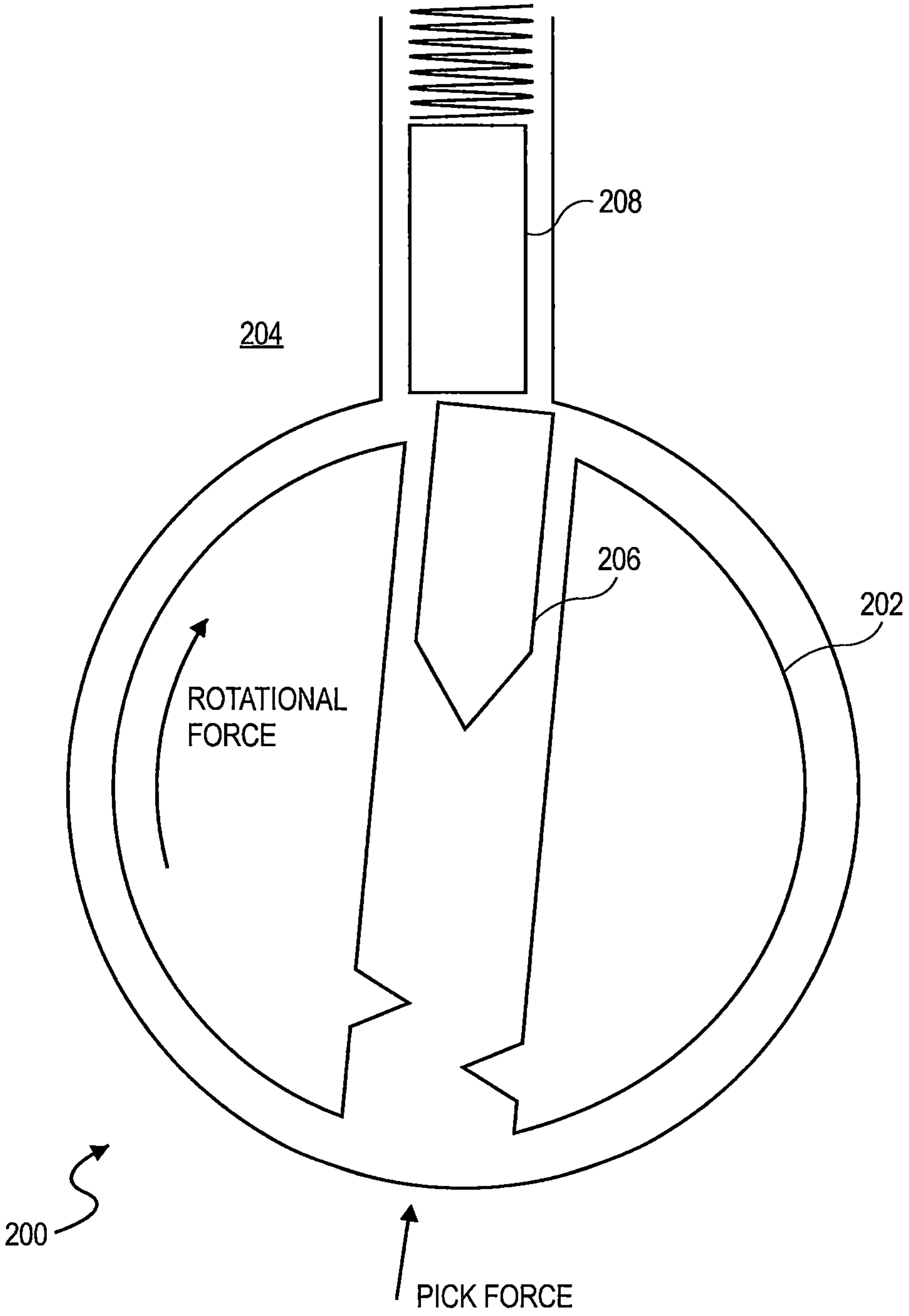
FIG. 2 (PRIOR ART)
FIG. 2 depicts a cross-section of a lock subjected to a typical picking attack.
Figure 3:
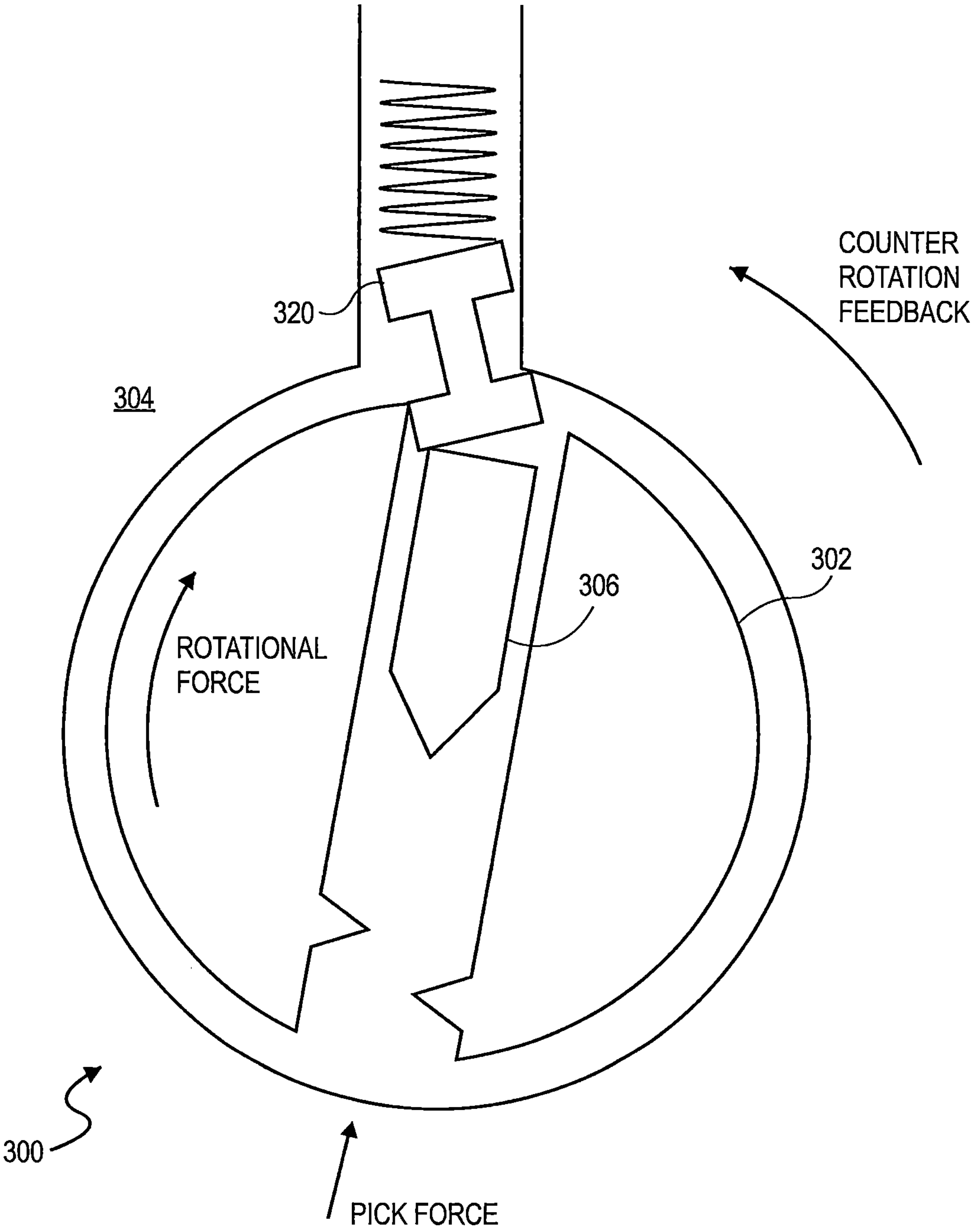
FIG. 3 (PRIOR ART)
FIG. 3 depicts a cross-section of a lock that includes a spool pin as a driver pin.

Although the segmented pin 400 shown in FIG. 1 is a driver pin, embodiments are not so limited. Segmented key pins are also contemplated, and may be embodied by appropriately shaping one of the right cylinders 432, 434, e.g., by beveling, to accommodate a key.

Figure 5:
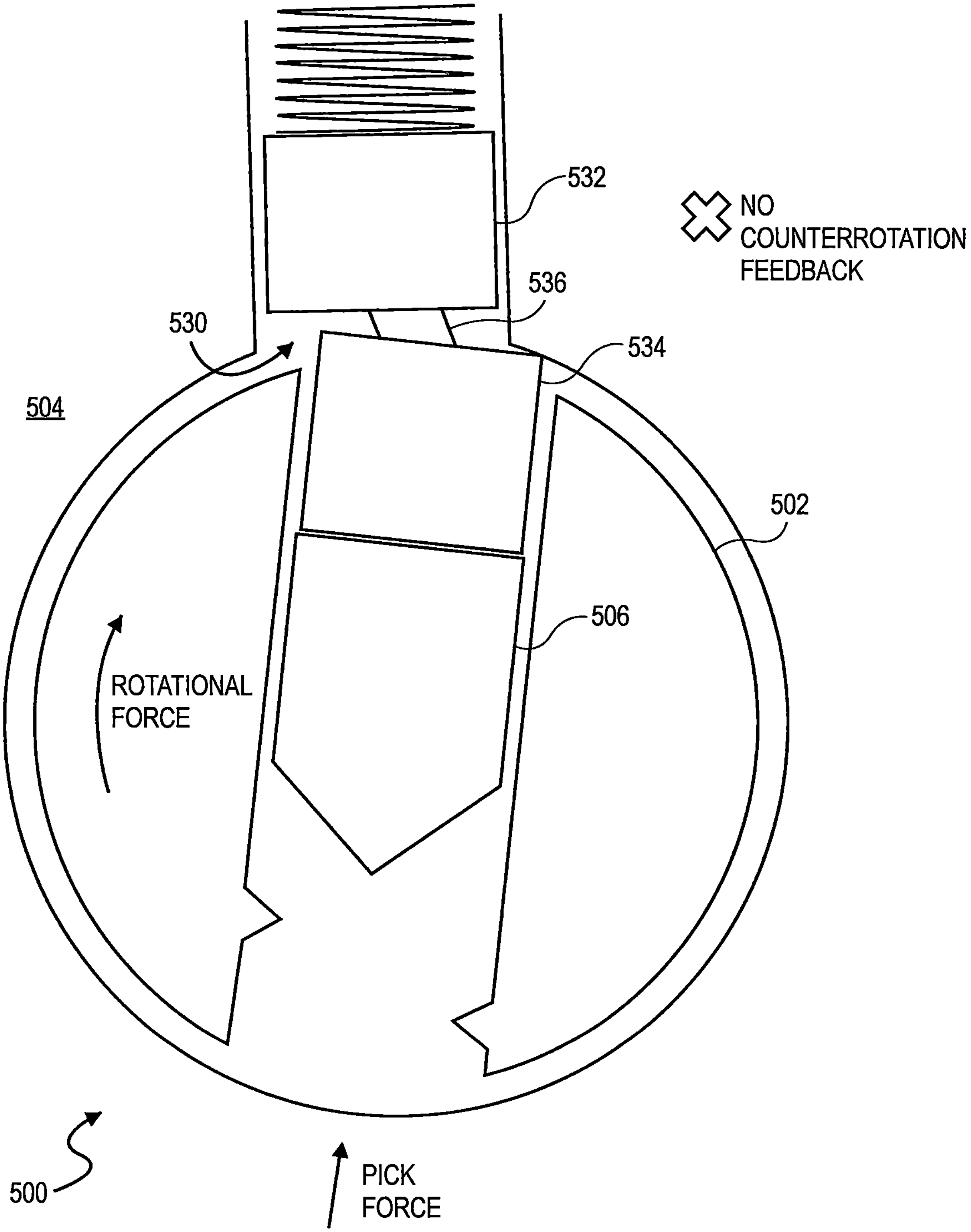
FIG. 5 depicts a cross-section of a lock that includes a segmented driver pin and that is subjected to a typical picking attack according to various embodiments.

FIG. 5 depicts a cross-section of a lock 500 that includes a segmented driver pin 530 and that is subjected to a typical picking attack according to various embodiments. As shown in FIG. 5, an attacker applies rotational force to the plug 502 relative to the hull 504 and applies linear force to the segmented driver pin 530 via the key pin 506 using a pick. The top right cylinder 532 of the segmented driver pin 530 clears the plug 502, and the plug 502 rotates due to the applied rotational force until the coupling member 536 engages the top right cylinder 532 and the bottom right cylinder 534 and prevents further separation of the top right cylinder 532 from the bottom right cylinder 534. The bottom right cylinder 534 moves laterally a distance of d (see FIG. 4) relative to the top right cylinder 532 as the plug 502 rotates. Further, the bottom right cylinder 534 tilts an angle of θ (see FIG. 4) relative to the top right cylinder 532 as the plug 502 rotates.

As the attacker continues to apply linear force to the segmented driver pin 530 by way of the key pin 506 using a pick, at least part of the offset of the bottom right cylinder 534 beyond the top right cylinder 532 by the distance d catches on the hull 504, as shown in FIG. 5. At that point, further linear force on the segmented driver pin 530 causes no further movement, as the edge of the bottom right cylinder 534 cannot pass through the hull 504. In particular, additional application of linear force causes no counterrotation feedback. For example, because the top right cylinder 532 may move laterally with respect to the bottom right cylinder 534 without requiring (although still permitting) tilt with respect to the bottom right cylinder, counterrotation feedback is prevented. Further, that the top right cylinder 532 can move axially relative to the bottom right cylinder 534 allows accommodates shift and tilt movement of the bottom right cylinder 534 within the plug 502 without requiring the top right cylinder 532 to move, thereby preventing counterrotation feedback. Yet further, the shape of the bottom right cylinder also assists in preventing counterrotation feedback. If the bottom right cylinder 534 were replaced by a sphere, for example, such a sphere would be able to roll past the edge of the hull 504, causing leverage, and thus producing counterrotation feedback.

The dimensions of a segmented pin according to various embodiments may be selected according to the following criteria. In general, due to the geometric configuration of cylindrical pin tumbler locks, the angle θ may be identical to the angle that the plug 502 rotates relative to the pin stack bore in the hull 504. In general, for a plug with radius R, where R is the distance from the axis of the plug to the shear line, for an angle θ that the plug rotates relative to when the pin stack bores of the plug and the hull are aligned, which may be identical to θ as shown in FIG. 4, and for a maximal pin width of w, the offset distance d between the driver pin and the key pin (see FIG. 4) may be described as follows, by way of non-limiting example:

$$d = w - \frac{1}{2}\cos\theta\left[w - \sqrt{4R^2 + w^2\sin\left(\theta - \arctan\frac{w}{2R}\right)}\right] \tag{1}$$

According to Equation (1), d is roughly proportional to θ. According to various embodiments, a segmented pin, such as is shown and described in reference to FIGS. 4-9, may be dimensioned to permit a d that is large enough to engage the hull, while 0 remains small enough to allow a set pin in a different pin stack to drop. According to various embodiments, this may be accomplished by selecting a sufficiently large d, by way of non-limiting example, 0.001", 0.002", 0.003", or greater, or 1%, 2%, 3% of the pin width or greater, and selecting a sufficiently small θ, by way of non-limiting example, less than 30°, 15°, 10°, 5°, or smaller, and using Equation (1) to ensure that the segmented pin accommodates the selected values for d and θ.

Figure 6:
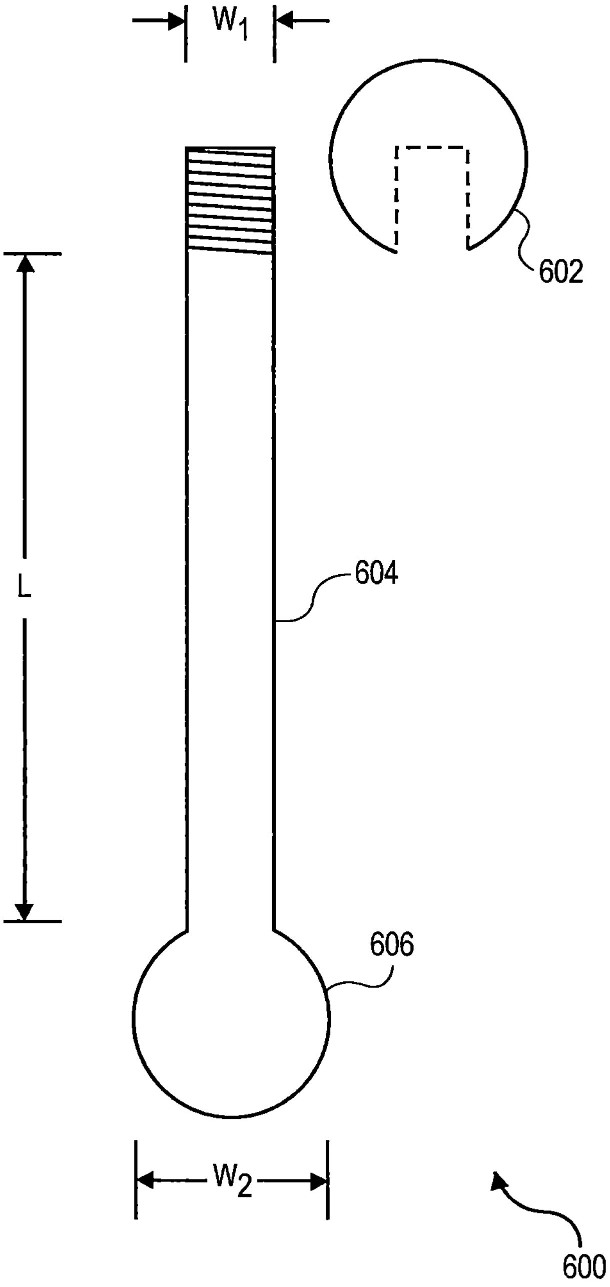
FIG. 6 depicts a cross-section of a coupling member of a segmented driver pin according to various embodiments.

FIG. 6 depicts a cross-section of a coupling member 600 of a segmented pin according to various embodiments. Coupling member 600 may be used in any of the embodiments shown and described herein. Coupling member 600 includes a shaft 604 and end stops 602, 606. According to various embodiments, the shaft 604 may be smooth, serrated, or threaded. According to various embodiments, the shaft 604 may have a cross section that is square, pentagonal, hexagonal, or octagonal. According to various embodiments, the end stops 602, 606 may be generally spherical, ellipsoidal, cylindrical, or right prisms of various shapes such as square, pentagonal, hexagonal, or octagonal.

According to various embodiments, the coupling member 600 may be constructed such that one or both end stops 602, 606 may be separable from, but engageable with, the shaft 604. Such engagement permits assembly of the segmented pin, according to such embodiments. According to various embodiments, the engagement may be accomplished by constructing one or both ends of the shaft 604 with threads, and one or both end stops 602, 606 similarly threaded, as shown by non-limiting example, in FIG. 6. According to other embodiments, the engagement may be accomplished by press-fitting the shaft 604 into a corresponding depression in one or both end stops 602, 604. According to some embodiments, an adhesive maybe introduced to secure the shaft 604 to one or both end stops 602, 604.

As shown in FIG. 6, the shaft 604 may have a length of L and a minimal diameter of $w_1$, and the end stops may have a minimal diameter of $w_2$. Values for these parameters may be selected in conjunction with parameters for right cylinders of a segmented pin, shown and described in reference to FIG. 7, to accommodate compliance with Equation (1) for selected values of d and θ, as described herein.

Figure 7:
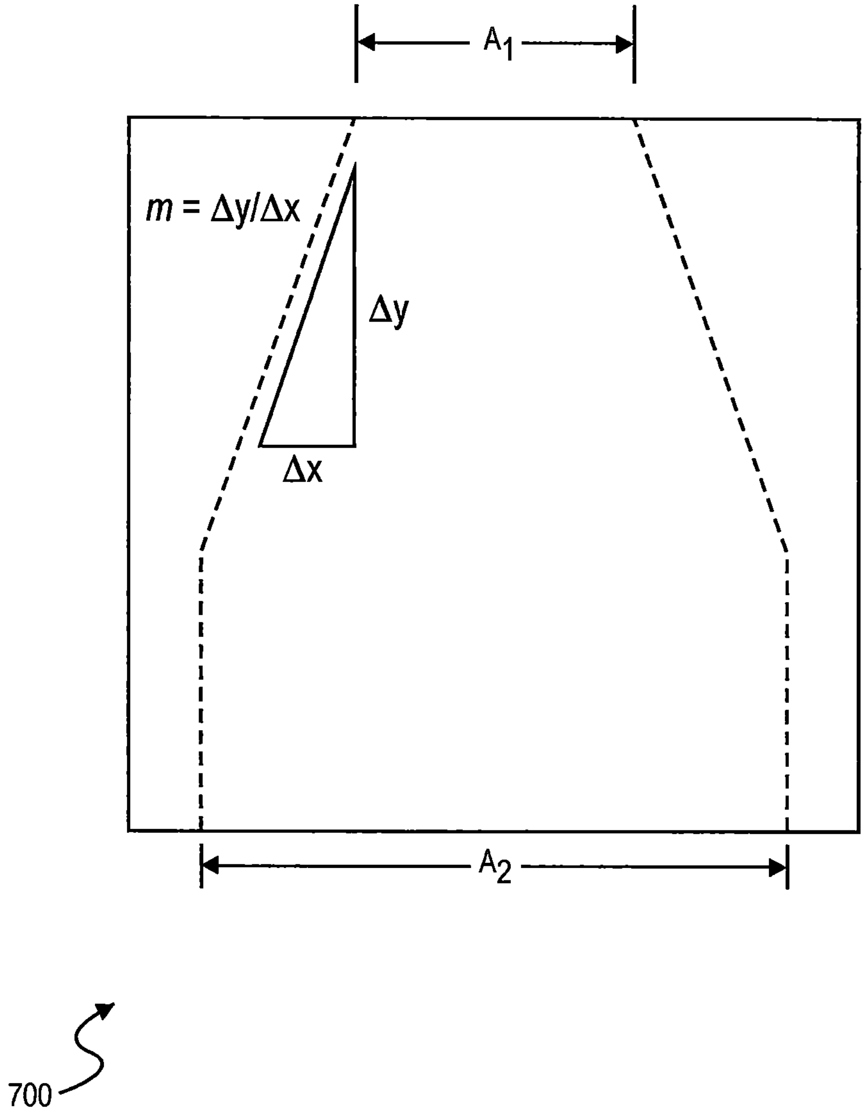
FIG. 7 depicts a cross-section of a right cylinder of a segmented driver pin according to various embodiments.

FIG. 7 depicts a cross-section of a right cylinder 700 of a segmented driver pin according to various embodiments. As shown in FIG. 7, the right cylinder 700 has an axial passage that defines a first aperture with minimal diameter $A_1$ and a second aperture with minimal diameter $A_2$, where $A_1<A_2$. Values for $A_1$ and $A_2$ may be selected such that $w_1<A_1<w_2<A_2$ (see FIG. 6). Such values may facilitate construction of a segmented driver pin using two such right cylinders 700 and a coupling member, such as the coupling member 600 of FIG. 6, and to ensure that the right cylinders are movably joined by the coupling member without being nondestructively separable. A transition region between the diameters defines a slope of m. Values for $A_1$ and m may be selected in conjunction with values for L, $w_1$, and $w_2$ to accommodate compliance with Equation (1) for selected values of d and θ, as described herein.

Figure 8:
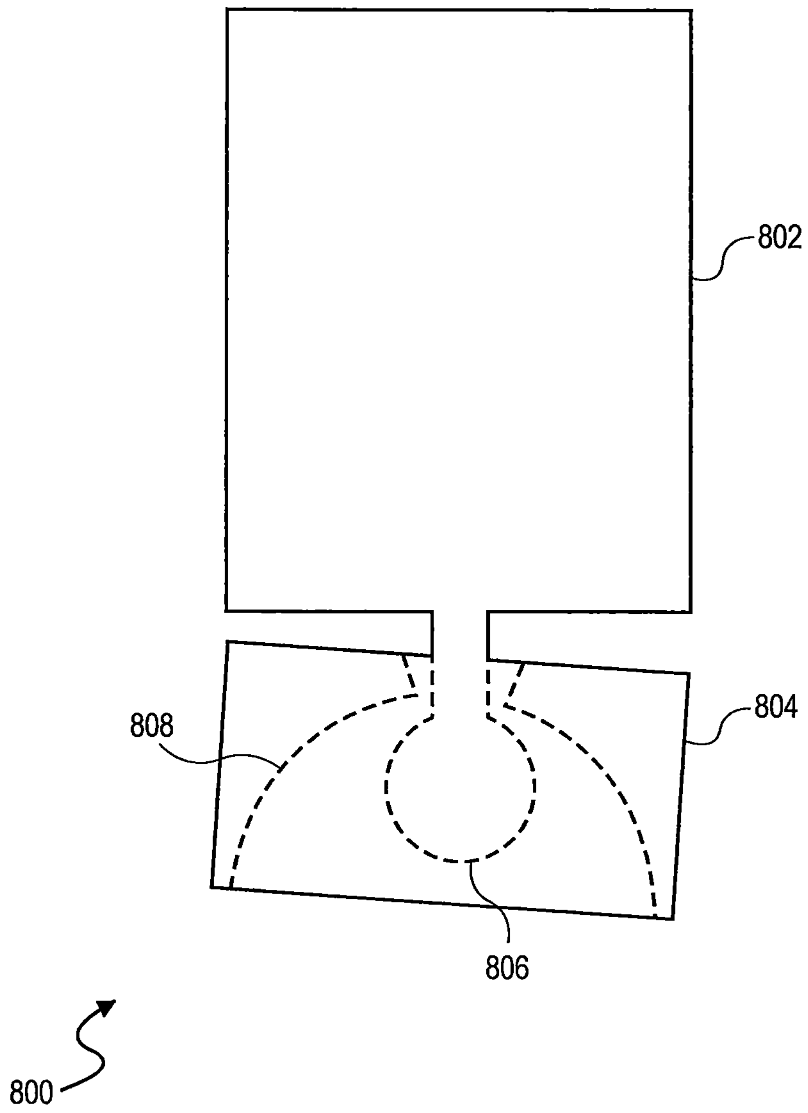
FIG. 8 depicts a cross-section of a segmented driver pin where one right cylinder has an integrated coupling member according to various embodiments.

FIG. 8 depicts a cross-section of a segmented driver pin 800 where one right cylinder has an integrated coupling member according to various embodiments. The segmented driver pin 800 includes a first right cylinder 802 and a second right cylinder 804.

The first right cylinder 802 includes an integrated coupling member 806. According to some embodiments, the integrated coupling member 806 is fixedly attached to the first right cylinder 802, e.g., by way of threading or press fitting, so that they cannot be nondestructively separated. This arrangement permits construction of the segmented driver pin 800.

The second right cylinder 804 defines a cavity 808 that joins to an aperture to accommodate the coupling member 806. The cavity 808 may be any of a variety of shapes, e.g., a hemisphere (as shown in FIG. 8), a frustrum of a cone (as shown in FIGS. 4 and 7), a different truncated shape, or any other shape that can accommodate the coupling member 806. The aperture may have a minimum diameter that permits the first right cylinder 802 to move relative to the second right cylinder 804 axially, laterally, and rotationally, e.g., as shown in reference to FIGS. 4 and 5. In addition, the large relative size difference, with a distinct gap, between the coupling member 806 and the cavity 808 further accommodates the axial, lateral, and rotational relative movement.

The first right cylinder 802 may have a different axial extent from that of the second right cylinder 804, as shown in FIG. 8.

Although shown as a segmented driver pin in FIG. 8, embodiments are not so limited. Some embodiments include a segmented key pin. According to some embodiments, a distal end of the first right cylinder 802 may is shaped, e.g., by beveling, to be roughly conical to accommodate a key so as to form a segmented key pin. (See the third right cylinder 906 of FIG. 9.) According to such embodiments, an asymmetry between the first right cylinder 802 axial extent and the second right cylinder 804 axial extent permits, for example, the first right cylinder 802 to be any arbitrary axial length. When implemented as a segmented key pin, such a segmented key pin may be retrofit to any lock with any key pin length, not limited to a key pin length that is an integer multiple of the axial extent of the first right cylinder 802 or an integer multiple of the axial extent of the second right cylinder 804. (For example, the segmented pin 800 has an axial extent that is approximately 3.5 times the axial extent of the second right cylinder 804 and approximately 7/5 times the axial extent of the first right cylinder 802.) Such retrofitting may be accomplished while retaining an existing key of any bitting; that is, any existing key may be utilized to unlock such a retrofit lock without requiring modification of the key. Locks openable with keys having any number of different cut depths, e.g., 4, 5, 6, 7, 8, 9, 10, or more, may be retrofit, and the existing key may be retained to open the lock so retrofit with one or more segmented key pins.

Advantageously, a plurality of segmented key pins may be manufactured to include second right cylinders 804 of the same length and a variety of first right cylinders 802 of various lengths. This simplifies a manufacturing process of segmented key pins of various lengths.

Figure 9:
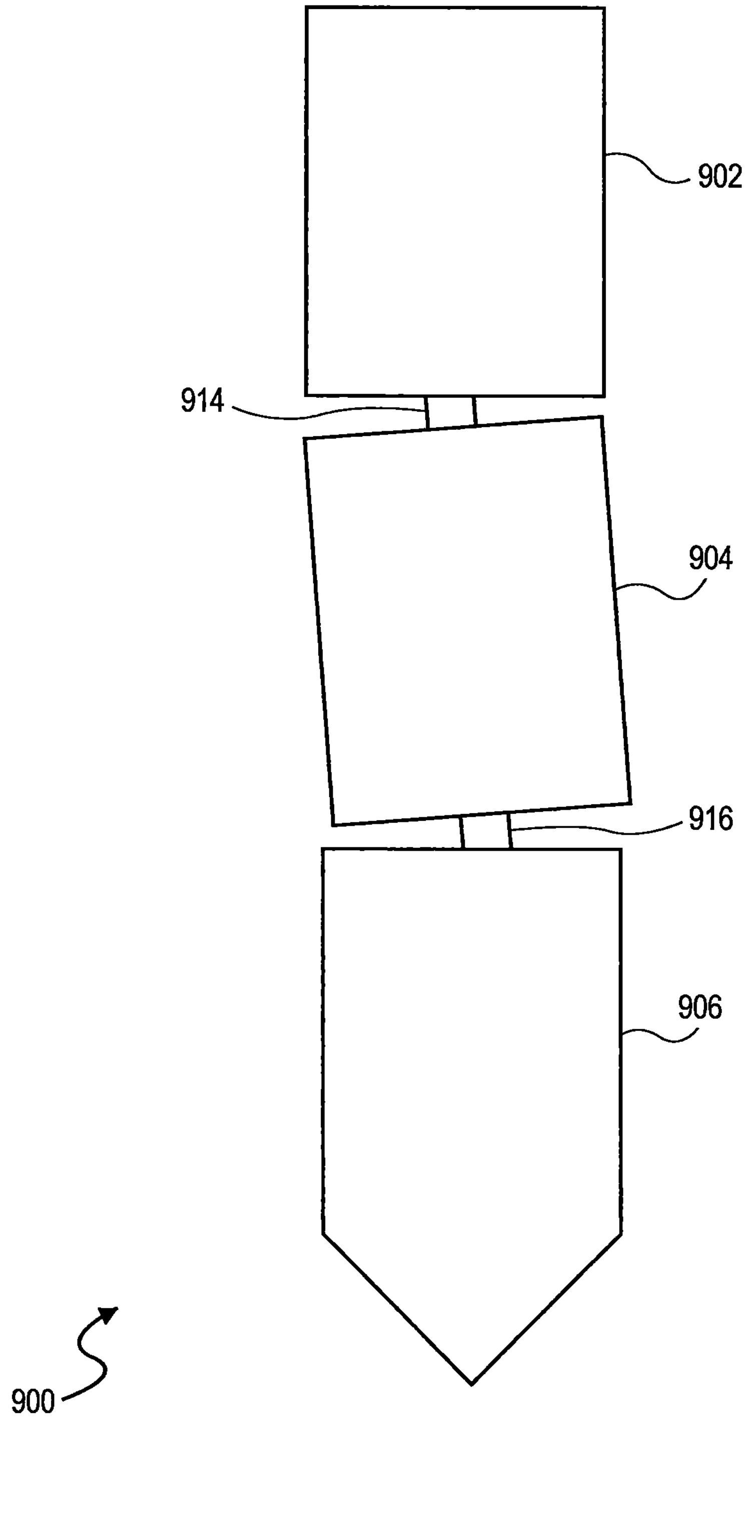
FIG. 9 depicts a cross-section of a three-cylinder segmented key pin according to various embodiments.

FIG. 9 depicts a cross-section of a three-cylinder segmented key pin 900 according to various embodiments. The segmented key pin includes a first right cylinder 902, a second right cylinder 904, and a third right cylinder 906. The first right cylinder 902 is movably joined to the second right cylinder 904 by a first coupling member 914. The second right cylinder 904 is movably joined to the third right cylinder 906 by a second coupling member 916. According to some embodiments, the first coupling member 914 and the second coupling member 916 are integrated with the second right cylinder 914, e.g., using techniques shown and described herein in reference to FIG. 8. According to some embodiments, one or both of the first coupling member 914 and the second coupling member 916 are not integrated with the second right cylinder 904. According to some embodiments, the second right cylinder is manufactured in two parts, that are subsequently joined, e.g., using threading or press fitting, with or without adhesive, so as to accommodate installation of the first coupling member 914 and/or the second coupling member 916.

Note that because a segmented pin as disclosed herein includes two or more segments that are axially movable with respect to each-other, such a segmented pin may have a range of total lengths, as measured from a fully axially extended length down to a fully axially compacted length. Accordingly, measurements of segmented pin lengths described herein may refer to a minimal length, which refers to a length when fully axially compacted.

Thus, according to various embodiments, segmented lock driver and key pins are disclosed. Many embodiments and variations are possible.

According to various embodiments, a segmented pin may have any of a variety of diameters, such as by way of non-limiting example, 0.115 inches, 0.135 inches, 0.108 inches, 0.95 inches, etc. According to various embodiments, a segmented driver pin may have any minimum length, such as by way of non-limiting example, 0.114 inches, 0.180 inches, 0.200 inches, 0.215 inches, etc. According to various embodiments, a segmented key pin may have any minimum length, such as by way of non-limiting example, any increment of 0.015 inches and/or 0.023 inches starting from any standard length, such as 0.114 inches, 0.172 inches, 0.180 inches, etc.

According to various embodiments, any or all of the components of a segmented pin can be manufactured from any of a variety of materials, including, by way of non-limiting example, brass, steel (e.g., stainless steel), titanium, etc.

Although embodiments are generally described herein in which both segments of a segmented pin are right cylinders, embodiments are not so limited. For example, any segment of any segmented driver pin or key pin may be shaped in any of a variety of shapes, including, but not limited to, a spool, a serrated right cylinder, a cone, a gin-bottle shape, a barrel shape, a T shape, etc.

Segmented pins as disclosed herein are simple to manufacture and the right cylinders may be generated using an existing pin lathe.

An independent feature of the embodiments explicitly shown and described herein may be combined in any permutation with one or more feature of any other embodiment. Such independent and recombinable features include, by way of non-limiting example, segments of different axial extent (e.g., as shown and described in reference to FIG. 8), beveling of a segment so as to accommodate a key (e.g., as shown and described in reference to FIG. 9), an integrated coupling member (e.g., as shown and described in reference to FIG. 8), a free coupling member (e.g., as shown and described in reference to FIG. 4), etc. Any embodiment may include any number of segments, not limited to two or three. Embodiments with four or more segments are contemplated.

According to some embodiments, a repinning kit that includes segmented driver pins and/or segmented key pins is provided. Such a repinning kit may include segmented pins of any, or a variety of, standard diameters, such as 0.115 inches, 0.135 inches, 0.108 inches, 0.95 inches, etc. Such a repinning kit may include segmented driver pins of any, or a variety of, standard lengths for their minimum lengths, such as 0.114 inches, 0.180 inches, 0.200 inches, 0.215 inches, etc. Such a repinning kit may include segmented key pins of any, or of a variety, of standard lengths for their minimum lengths, such as any increment of 0.015 inches and/or 0.023 inches, starting from any standard length, such as 0.114 inches, 0.172 inches, 0.180 inches, etc.

Segmented key pins according to some embodiments are advantageous because when an attacker oversets a pin stack by pushing at least part of the key pin into the hull of the lock, which is a regular occurrence in picking attacks, disparate segments of the segmented key pin may span the shear line, thus trapping the key pin in position, causing a situation as shown and described with respect to driver pins in reference to FIG. 5.

Advantageously, segmented driver pins and/or segmented key pins may be retrofit in any lock, and the existing key can be used in such a retrofit lock. Segmented pins may be combined in the same lock with one or more standard pin and/or one or more security pin, such as by way of non-limiting example, a spool pin, a serrated pin, a barrel pin, a gin bottle pin, a T pin, etc. Retrofitting an existing lock with segmented driver pins and/or segmented key pins is a simple operation that any locksmith can accomplish without requiring special tools unique to segmented pins. Such retrofitting is less complicated than rekeying a lock because the existing key can be retained and reused such that no new key needs to be cut.

Moreover, a lock that includes, or is retrofit with, one or more segmented driver pins and/or one or more segmented key pins is less susceptible to picking attacks and therefore more secure, in comparison to such a lock that lacks any segmented pins.

While example embodiments of the invention have been shown and described, those skilled in the art will be able to make various modifications to the described embodiments without departing from the scope. Those skilled in the art will recognize that modifications and other variations are possible within the scope, as defined in the following claims and their equivalents.

What is claimed is:

1. A lock comprising:

a hull;

a cylindrical plug disposed within the hull, wherein the plug defines a keyway and a plurality of plug bores that communicate with the keyway through the plug, wherein the plurality of plug bores, in a locked position of the lock, communicate with a corresponding plurality of hull bores formed in the hull;

a plurality of spring-loaded pin stacks comprising a plurality of key pins and a plurality of driver pins, each pin stack comprising a key pin and a driver pin, wherein the plurality of spring-loaded pin stacks are movable, by a key inserted into the keyway, to position interfaces between key pins and driver pins to a shear line between the plug and the hull to allow rotation of the plug about its longitudinal axis relative to the hull to unlock the lock; and a segmented driver pin of the plurality of driver pins, wherein the segmented driver pin comprises a first right cylinder, a second right cylinder, and a coupling member that is movably joined to the first right cylinder and movably joined to the second right cylinder, wherein the first right cylinder is axially, laterally, and rotationally movable with respect to the second right cylinder, and wherein the segmented driver pin provides no counterrotation feedback during a lock picking attempt once the first right cylinder is in the hull, the second right cylinder is in the plug, and an edge of the second right cylinder engages the hull.

2. The lock of claim 1, wherein an axial extent of the first right cylinder is different from an axial extent of the second right cylinder.

3. The lock of claim 2, wherein the segmented driver pin has an axial extent that is not an integer multiple of an axial extent of the first right cylinder or of an axial extent of the second right cylinder.

4. The lock of claim 1, wherein the segmented driver pin comprises a third right cylinder, wherein the third right cylinder is movably joined to the second right cylinder, wherein the third right cylinder is axially, laterally, and rotationally movable with respect to the second right cylinder.

5. The lock of claim 1, wherein the first right cylinder defines an axial passage through the first right cylinder, the axial passage defining a first aperture at a first end of the first right cylinder and a second aperture at a second end of the first right cylinder, wherein the first aperture defines a minimum diameter that is smaller than a minimum diameter of the second aperture.

6. The lock of claim 1, further comprising a segmented key pin of the plurality of key pins, wherein the segmented key pin comprises a first key pin right cylinder and a second key pin right cylinder, wherein the first key pin right cylinder is movably joined to the second key pin right cylinder, wherein the first key pin right cylinder is axially, laterally, and rotationally movable with respect to the second key pin right cylinder.

7. The lock of claim 6, wherein an axial extent of the first key pin right cylinder is different from an axial extent of the second key pin right cylinder.

8. The lock of claim 7, wherein the segmented key pin has an axial extent that is not an integer multiple of an axial extent of the first key pin right cylinder or of an axial extent of the second key pin right cylinder.

9. The lock of claim 6, wherein the segmented key pin comprises a third key pin right cylinder, wherein the second key pin right cylinder is movably joined to the third key pin right cylinder, wherein the second key pin right cylinder is axially, laterally, and rotationally movable with respect to the third key pin right cylinder.

10. A lock repinning kit comprising a plurality of pins for repinning a lock, the lock repinning kit comprising:

a plurality of segmented pins, each segmented pin comprising a first right cylinder, a second right cylinder, and a coupling member that is movably joined to the first right cylinder and movably joined to the second right cylinder, wherein each first right cylinder is axially, laterally, and rotationally movable with respect to the respective second right cylinder.

11. The lock repinning kit of claim 10, wherein the plurality of segmented pins comprises a segmented driver pin, wherein the segmented driver pin provides no counter-rotation feedback during a lock picking attempt once the first right cylinder of the segmented driver pin is in a hull of the lock, the second right cylinder of the segmented driver pin is in a plug of the lock, and an edge of the second right cylinder engages the hull.

12. The lock repinning kit of claim 10, wherein the plurality of segmented pins comprises a plurality of segmented key pins.

13. The lock repinning kit of claim 12, wherein the plurality of segmented key pins comprises a first segmented pin and a second segmented pin, wherein an axial extent of the first segmented pin is greater than an axial extent of the second segmented pin by 0.015 inches or 0.023 inches.

14. The lock repinning kit of claim 12, wherein the plurality of segmented key pins comprises segmented key pins of a plurality of minimum lengths for retrofitting to a lock with a corresponding key that defines at least four different cut depths.

15. A segmented lock driver pin comprising:

a first right cylinder;

a second right cylinder; and a coupling member, wherein the first right cylinder is movably joined to the second right cylinder by the coupling member, wherein the first right cylinder is axially, laterally, and rotationally movable with respect to the second right cylinder, and wherein the segmented lock driver pin provides no counterrotation feedback during a picking attempt of a lock in which the segmented driver pin is installed once the first right cylinder of the segmented driver pin is in a hull of the lock, the second right cylinder of the segmented driver pin is in a plug of the lock, and an edge of the second right cylinder engages the hull of the lock.

16. The segmented lock security pin of claim 15, wherein the first right cylinder defines an axial passage through the first right cylinder, the axial passage defining a first aperture at a first end of the first right cylinder and a second aperture at a second end of the first right cylinder, wherein the first aperture defines a minimum diameter that is larger than a minimum diameter of the second aperture.

17. The segmented lock driver pin of claim 15, wherein an axial extent of the first right cylinder is different from an axial extent of the second right cylinder.

18. The segmented lock driver pin of claim 17, wherein the segmented lock security pin has an axial extent that is not an integer multiple of an axial extent of the first right cylinder or of an axial extent of the second right cylinder.

19. The segmented lock driver pin of claim 15, wherein the coupling member is integral with one of the first right cylinder or the second right cylinder.

* * * * *